June 27, 1961 J. F. CUSS 2,989,786
DOORS
Filed Dec. 17, 1959 2 Sheets-Sheet 1
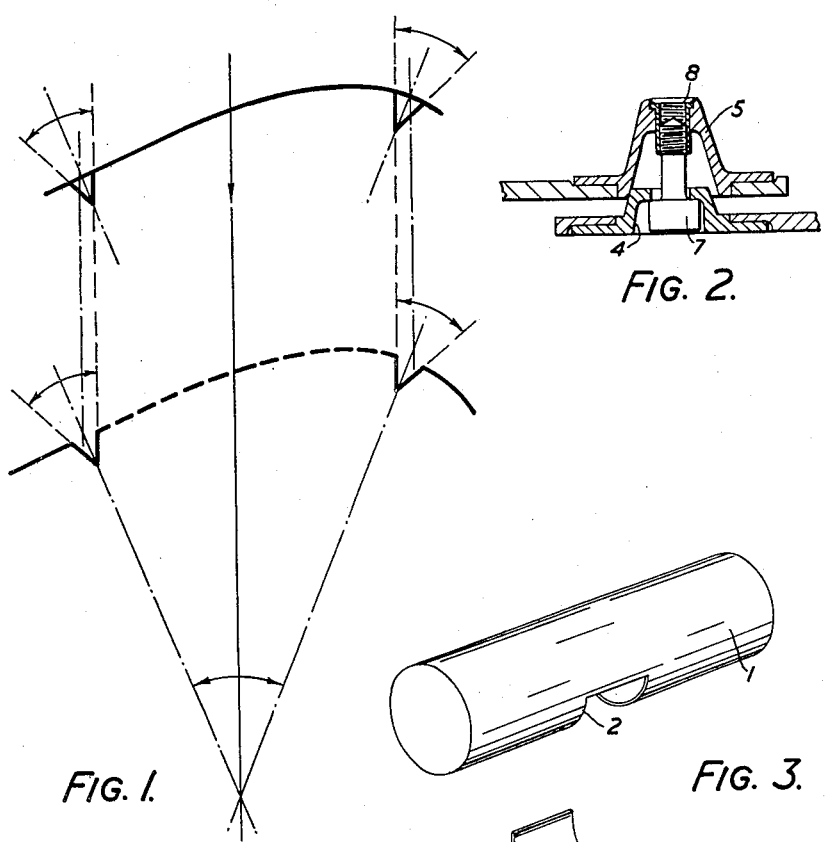
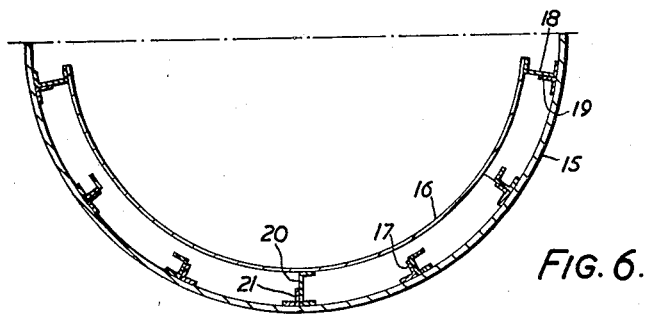
INVENTOR
John Freeman Cuss
BY
Pierce, Scheffler & Parker
ATTORNEYS June 27, 1961 J. F. CUSS 2,989,786
DOORS
Filed Dec. 17, 1959 2 Sheets-Sheet 2

INVENTOR
John Freeman Cuss
BY
Pierce, Scheffler + Parker
ATTORNEYS

United States Patent Office 2,989,786
Patented June 27, 1961

2,989,786
DOORS
John Freeman Cuss, Cheltenham, England, assignor to Gloster Aircraft Company Limited, Gloucestershire, England, a British company
Filed Dec. 17, 1959, Ser. No. 860,244
Claims priority, application Great Britain Dec. 22, 1958
6 Claims. (Cl. 20—16)

This invention is concerned with improvements in or relating to structures which include a wall having an opening therein and a closure in respect of the opening.

Where a wall of a structure, such for example as an aircraft fuselage, defines an aperture, for example for access to the interior, the frame members of the structure are interrupted at the aperture. There is thus a weakness in the structure and while the provision of a closing panel hinged or bolted to the margin of the aperture will to a degree reinforce the structure, play will necessarily occur either between the rim of the closing panel and the surrounding margin of the aperture or between the bolts and their bolt holes.

It has been proposed to provide captive fasteners for securing a closing panel the fasteners comprising co-operating conical projections and recesses, the projections resting in the recesses so that there is no play therebetween, attachment devices being provided to lock the co-operating projections and recesses together. The particular advantage of these fasteners is that there being no play, forces are transferred directly from the structure to the closing panel or through the closing panel to the structure. Such fasteners have a further particular advantage in that they can be separated by moving the projection along a path diverging from the recess axis which is not the case with cylindrical members unless considerable play is provided. With such an arrangement, as can be seen in FIGURE 1 of the accompanying drawings a curved panel can be moved directly on to a curved landing provided that the angle of the recesses is equal to or greater than the angle between the axes of the two recesses. That is to say the individual projections must lie within the projected cones of their co-operating recesses. There is a limit to the cone angle of the recesses set by practical considerations and a suitable angle in practice is 45°, though it may be on occasions higher. It will be seen therefore that a limit is set to the degree of the angle between the recess axes and only limited apertures can be closed with fasteners of this nature.

It is an object of he present invention to provide an arrangement whereby apertures may be closed with a single closure, the apertures extending through angles up to substantially 360°.

According to the present invention there is provided a structure including a wall a part of which extends through an angle, that part defining an aperture two opposite margins of which are at an angle to one another, each of these opposite margins including a recess engaged by a projection, on a margin of a closing panel, removable therefrom along a path diverging from the recess axis, the angle of the margins being such that parts of the projections are so spaced as to lie behind portions of the recesses and thereby would foul the recesses on movement of the closing panel in its normal condition away from the wall, the closing panel being resiliently deformable whereby a part may be flexed to permit a projection to be moved out of its recess so that the other projection may then be disengaged from its recess.

In order that the present invention may be well understood, one embodiment thereof, given by way of example only, will now be described with reference to the accompanying drawings in which:

FIGURE 1 is a schematic showing of the angular relationship between the projections on a panel and the recesses on a curved surface.

FIGURE 2 is a cross section of a fastener in the partially disengaged condition;

FIGURE 3 is a perspective view of a cylindrical structure with a closing panel removed;

FIGURE 6 is a cross section through a double skin closing panel.

Figure 4:
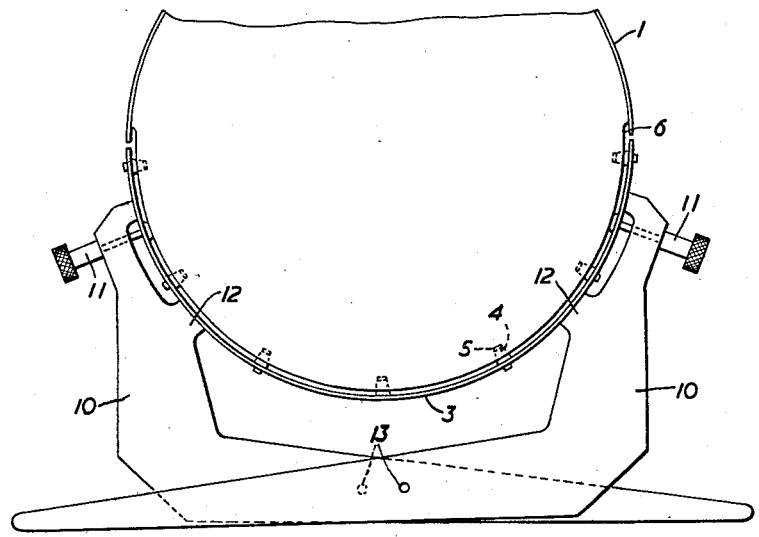
FIGURE 4 is a cross section through the structure of FIGURE 3 within the ends of the aperture.

Referring to FIGURE 3, the structure is a cylindrical body 1 having an aperture 2 subtending an angle of 180°. A closing panel 3 is provided for the aperture. The closing panel carries at its margin projections in the form of tapered spigots 4 (FIGURE 2) and the structure includes, in the closing panel landing, recesses in the form of correspondingly tapered sockets 5 (FIGURE 2) for engagement together. It will be seen that with a tapered socket 5 which in the illutsrated embodiment is conical and a corresponding conical spigot 4, when fully mated together, there is no play laterally therebetween and they will transfer directly, one to the other, shear forces. Also it will be seen that the spigot may be moved out of the socket along a path diverging from the axis of the socket. Referring now to FIGURE 4, it will also be seen that with the closing panel in place and the spigots and sockets engaged, the closing panel in its normal state cannot be withdrawn since the nearest parts of at least the extreme projections lie within the outer diameter of the landing 6.

Figure 5:
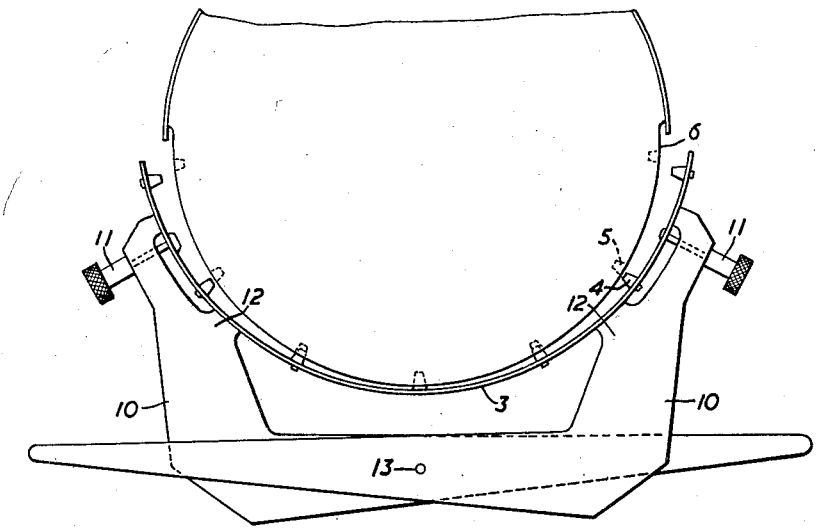
FIGURE 5 is a cross section corresponding to FIGURE 4 with the closing panel ready for removal, after undoing the lowest fastener.

The closing panel however, is constructed so that under normal conditions its periphery has a form corresponding to the form of the landing 6 (in other words, in the absence of the spigots it would be movable directly on to the landing and mate with it) and is resiliently deformable so that those spigots which would otherwise foul the sockets on withdrawal of the closing panel can be freely withdrawn from their sockets. Referring to FIGURE 5, it will be seen that the closing panel is opened out whereby the spigots may be progressively disengaged from the opposite extremities toward the centre.

In FIGURE 4 the spigots are engaged and the closing panel is seated on the landing. To remove the closing panel, levers 10 are secured to the closing panel as by threaded members 11. Preferably the lowermost fasteners are kept engaged while the remainder are undone; after which the levers are pivoted about their feet 12 until apertures 13 register, when a pin may be inserted which will lock the whole in the strained position (see FIGURE 5).

The closing panel may then be moved away after undoing the lowermost fasteners and to reinstate it the closing panel is presented to the landing, the centre spigots nest in their sockets and are locked in and the levers are released so that the closing panel reassumes its natural condition on the landing when the remaining spigots mate with and are locked to their respective sockets. The levers are preferably detached once the lowermost fasteners are locked. Other means may be employed for flexing the closing panel for mounting and dismounting purposes.

The fasteners, one of which is shown in FIGURE 2, may be locked together by a screw 7 captive in the spigot. Preferably the screw is slack in the spigot so that should the parts, as in FIGURE 2, be offset when presented to one another, the screw can still be started in the bore 8 of the socket and will draw the parts into their proper nested condition.

The closing panel consists essentially of a single skin which can be flexed in the manner described earlier—if this single skin, from structural considerations is not sufficiently robust to meet the other structural demands imposed upon it then it is conveniently reinforced with longitudinal stringers only, which impart to it an adequate compressive strength. In addition, a small degree of transverse reinforcement may be included, in the shape of shallow frames, provided they are sufficiently flexible to allow the door to be opened in the manner described. Should it be for any reason necessary to use an inner skin, for purposes for example for heat-shielding, it is still possible to use such a skin provided it is fixed only to the closing panel in a manner which will not interfere with the flexibility requirements described. One method (see FIGURE 6) is to deepen certain of the stringers 19 and 21 by means of extensions 18 and 20 in order to carry a light inner skin 16 at some distance from the outer skin 15 and so form a heat insulating air gap. On flexure of the outer skin the inner skin straightens between its attachment points to the deepened stringers without appreciable restraint on the closing panel itself.

In view of the absence of any transverse members in the closing panel, the closing panel will have a certain amount of transverse flexibility but is sufficiently rigid for easy handling when free.

It will be understood that a closing panel may be provided for angles up to 360°, where two extremities of the closing panel would be anchored on a common landing extending across the aperture. Furthermore the invention provides a closing panel which may be secured on a landing curved in two dimensions or on a landing which comprises a number of flats at an angle to one another.

What is claimed is:

1. A structure including a wall having a part thereof which extends through an angle, said wall part including an aperture, a closure panel for said aperture made from a resiliently deformable material and adapted to be seated on the marginal portions of said aperture, said closure panel in its undeformed state having a configuration corresponding to that defined by the marginal portions of said aperture, a plurality of tapered sockets arranged in spaced relation along two oppositely disposed marginal portions of said aperture and a plurality of spigots having a taper complementary to that of said sockets arranged in spaced relation along the corresponding opposite edge portions of said closure panel and adapted to be seated respectively in said sockets, said closure panel being removable by deformation of the same in a progressive manner along the line of interconnected sockets and spigots to thereby effect a corresponding progressive separation of said spigots from their respective sockets, the innermost end of each spigot being movable outwardly from its respective socket along a path lying within the taper angle of said socket.

2. The invention as defined in claim 1 wherein said wall part which includes said aperture is curvilinear.

3. The invention as defined in claim 1 and which further includes means for locking each of said spigots in its corresponding socket.

4. The invention as defined in claim 3 wherein each of said locking means includes a locking screw extending axially through the spigot and which is threadedly engaged with an axially extending threaded portion in said socket, said screw being slack in said spigot when disengaged from said socket so that said screw may be engaged with said threaded portion even when said spigot and socket are out of alignment to thereby draw the spigot and socket into the seated position.

5. The invention as defined in claim 1 wherein said sockets and spigots have complementary conical surfaces.

6. A structure including a wall having a part thereof which extends through an angle, said wall part including an aperture, a closure panel for said aperture made from a resiliently deformable material and adapted to be seated on the marginal portions of said aperture, said closure panel in its undeformed state having a configuration corresponding generally to that defined by the marginal portions of said aperture, a plurality of recesses arranged in spaced relation along two oppositely disposed marginal portions of said aperture and a plurality of projections having a configuration complementary to that of said recesses for interfitting therewith arranged in spaced relation along the corresponding opposite edge portions of said closure panel, said closure panel being removable only by deformation of the same in a progressive manner along the line of interfitting recesses and projections to effect a corresponding progressive separation of said projections from their respective recesses, the innermost end of each projection being movable outwardly from its respective recess along a path which clears the wall of said recess.

References Cited in the file of this patent

UNITED STATES PATENTS

| 1,903,784 | King | Apr. 18, 1933 |
| 2,554,957 | Riblet | Mar. 29, 1951 |
| 2,900,697 | Cuss | Aug. 25, 1959 |

FOREIGN PATENTS

| 773,814 | Great Britain | May 1, 1957 |